United States Patent [19]

Connors

[11] 4,380,764
[45] Apr. 19, 1983

[54] DATA ACQUISITION APPARATUS

[75] Inventor: Stephen A. Connors, Tewksbury, Mass.

[73] Assignee: Data Translation, Inc., Marlboro, Mass.

[21] Appl. No.: 242,840

[22] Filed: Mar. 12, 1981

[51] Int. Cl.³ .......................... H04J 3/02; H04Q 7/00; G01R 11/52
[52] U.S. Cl. .......................... 340/870.37; 324/60 CD; 370/113
[58] Field of Search ...................... 340/870.37, 870.13, 340/870.14, 870.03, 870.01, 653, 635; 370/113; 324/60 CD, 61 R

[56] References Cited

U.S. PATENT DOCUMENTS 3,051,791 8/1962 Young et al. .................. 370/113
3,665,108 5/1972 Bowers, Jr. .................. 370/113

Primary Examiner—Thomas A. Robinson
Attorney, Agent, or Firm—Wolf, Greenfield & Sacks

[57] ABSTRACT

A data acquisition circuit is disclosed which provides sampled input voltage signals generated in a hostile environment to an input device, for example, the input circuitry of a computer. The data acquisition circuit provides electrical isolation to prevent damage to the input circuitry caused by electrical transients and short circuits occurring in the hostile environment and is particularly useful for sampling input data from thermocouples because it eliminates the need for an isolated power supply normally used to detect broken thermocouples.

14 Claims, 2 Drawing Figures

DATA ACQUISITION APPARATUS

FIELD OF THE INVENTION

This invention relates in general to data acquisition multiplexer circuits and, in particular, to data acquisition multiplexer circuits of the "capacitor transfer" type which provide electrical input isolation.

BACKGROUND OF THE INVENTION

Modern day electrical measurement and computing circuits are used in a variety of applications and are increasingly being applied to actual production situations to perform various control operations such as process control, machine tool control, data monitoring and a variety of other applications which require the measurement and computing circuitry to sample input signals generated in the production environment, perform computations and produce output signals to the production environment to control various aspects of the manufacturing or process operations.

Input data to be processed by such electrical circuitry in a manufacturing environment is often "noisy" in that it contains many extraneous signals in addition to the desired signal. Often the extraneous signals are magnitudes larger than the desired signals. For example, in order to control a manufacturing process, a computer may be required to measure the output signals developed by a number of thermocouples which measure temperature variables at various points in the process. The output signal developed across the thermocouple during the measurement operation may be in the order of one millivolt. However, thermocouples typically operate in environments associated with electrical heaters and other electrical power elements which may generate large electrical transients across the thermocouple or place a high voltage on the thermocouple due to short circuits and other malfunctions. Thus the electrical potential between the thermocouple and the computer may be many hundreds of volts.

In order to detect low level input signals, sensitive circuits must be designed into the measurement circuitry. Such sensitive input circuitry would be destroyed if a large transient or extraneous high voltage signal were accidently applied to the circuitry and thus a direct connection between the computer and the sensing device is not possible.

THE PRIOR ART

In order to protect sensitive input circuits from extraneous noise and voltages during operation in a noisy environment, various data acquisition circuits have been devised which provide electrical "isolation" between the noisy environment and the input circuitry. In effect, such data acquisition devices allow an input circuit to electrically "float" with respect to the electrical circuit ground in the noisy environment while measuring the desired signal developed across the sensing element. Therefore, the input circuitry can measure the desired signal but is unaffected by transients and extraneous noise.

Typically, prior art data acquisition circuits assume the form of a "sample and hold" circuit in which a signal sampling capacitor can be alternately connected to the sensing element and to the input circuitry by means of a set of electro mechanical switches.

The capacitor is never connected to both the sensing element and the input circuit at the same time so that there is electrical isolation of the input circuit from any extraneous transients and voltages which may appear on the sensing element. The prior art data acquisition devices, while simple in design and implementation, have several significant problems.

First, electromechanical reed relays were typically used to connect the sampling capacitor to the sensing element then alternately to the sensing input circuits. The use of such reed relays presented a reliability problem since each relay had a relatively short lifetime (compared to solid state devices) due to the electromechanical construction. The problem was compounded by the fact that several relays were used in each acquisition circuit, thus further lowering the reliability of the total circuit.

A second related problem with the prior art arose where data acquisition circuits were required to function in "real time" applications. In a real time application, the computer or other processing device is required to sample inputs, compute a result and use the computed result to control the process while the process is actually occurring. Real time applications require the use of high speed sampling equipment and high speed data processing equipment. When electromechanical reed relays were used in a data acquisition circuit, their operation time necessarily slowed down the sampling time. The slow sampling speed of the reed relay circuitry was due in part to the inherent reliability problem. Specifically, in order to avoid quickly wearing out the reed relays, the relays could not be continuously operated. Therefore, each time a measurement was made the relays had to be operated first to connect the sampling capacitor to the sensing element and then to connect the capacitor to the input circuitry. This dual cycle of operation (which was required each time a measurement was taken) further slowed the measurement process and prevented reliable high speed operation.

An additional problem with the prior art arose when prior art data acquisition circuits were used to sample input signals produced by thermocouple sensors. Typically, in order to determine whether a thermocouple was functioning properly and was not broken, a voltage was applied across the thermocouple from a power supply through a very large resistance. When the thermocouple is operating normally the current flow through the large resistance produces a negligible voltage change in the thermocouple output. However, if the thermocouple becomes broken, current running through the large resistance quickly charges the sampling capacitance to the power supply voltage. The power supply voltage across the thermocouple leads signals the input circuitry that there is a problem with the associated thermocouple. Unfortunately, in order to implement such a scheme with a prior art isolated data acquisition circuit, it was necessary to use an isolated power supply in the thermocouple monitor circuitry in order to maintain the electrical isolation of the input circuitry. Thus each data acquisition channel required its own isolated supply. While each isolated supply, in itself, is relatively inexpensive, over a large number of channels the total cost of the power supplies becomes substantial.

SUMMARY OF THE INVENTION

The above-mentioned and other problems are solved in one illustrative embodiment of the invention in which the reed relays used in the prior data acquisition circuits are replaced by "V-MOS" solid state optical isolation devices and an additional capacitor is connected to the output of the data acquisition device. Instead of being switched only during a measurement cycle, the inventive circuit is run continuously from a free-running squarewave oscillator. As a result, a voltage develops on the additional capacitor which is equivalent to the voltage across the sensing element. Since this voltage is, in effect, continuously present on the additional capacitor, it may be sampled at any convenient time and applied to the input circuitry. The inventive circuit is therefore capable of high speed operation because all outputs can be scanned quickly by means of a high-speed A/D converter. In addition, even though electrical isolation is maintained, there is effective electrical charge transfer through the inventive data acquisition circuitry both from input to output and from output to input. Therefore, when the inventive circuitry is used with a thermocouple, the power supply for the thermocouple monitoring circuit can be placed on the output side of the data acquisition circuit rather than the input side. During normal operation a charge transfer will take place in the direction from the output of the inventive circuit to the input causing a current to flow through the thermocouple. This current flow will maintain the voltage across the additional capacitor at a low value. However, if the thermocouple should break, the charge transfer will no longer take place and the output voltage on the additional sampling capacitor will rise to the power supply voltage, signalling the input circuitry that the thermocouple has malfunctioned. Thus, an isolated supply is not required.

DETAILED DESCRIPTION

Figure 1:
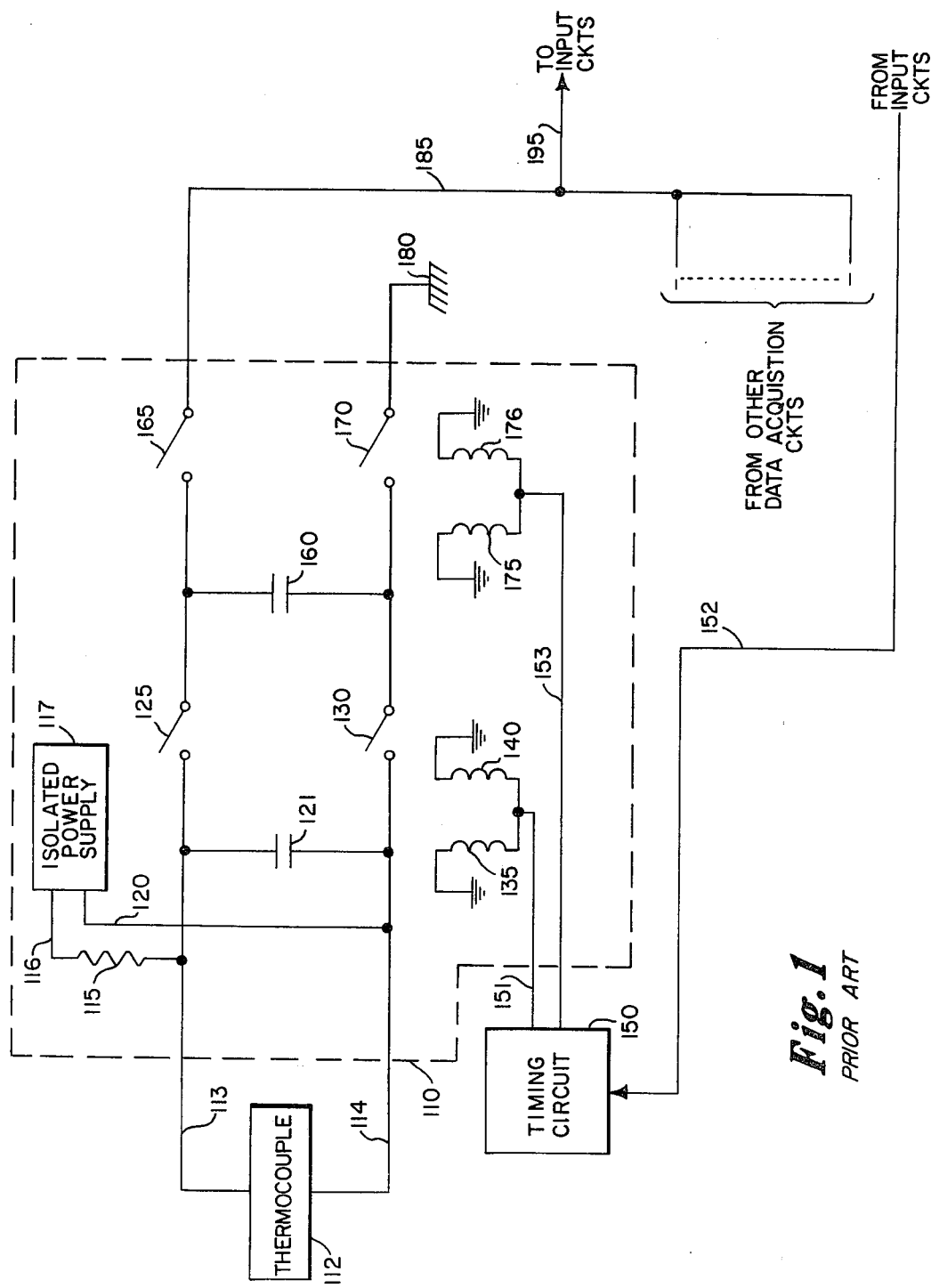
FIG. 1 of the drawing shows the prior art reed relay data acquisition circuit.

Referring to FIG. 1, prior art data acquisition circuit 110 samples input signals produced by thermocouple 112 and provides them, via lead 195, to input circuitry which illustratively might be computer input circuitry. Other data acquisition circuits may also be similarly connected to the input circuitry.

Circuit 110 is controlled by the input circuitry via control lead 152 and timing circuit 150. Timing circuit 150 operates the data acquisition circuits via leads 151 and 153 so that the data acquisition circuits operate in a multiplex manner—that is, only one circuit provides data on lead 195 at any one time.

During operation of the prior art circuit, thermocouple 112 develops a signal across its leads which is is applied to sampling capacitor 121. In the process of making a measurement, timing circuit 150 first applies a high signal to lead 151. This high signal energizes the coils 135 and 140 of two sampling reed relays. Coil 135 causes the contacts 125 to close. Similarly, coil 140 upon being energized causes contacts 130 to close. The signal in capacitor 121 is therefore transferred via closed contacts 125 and 130 to capacitor 160.

To complete the measurement, timing circuitry removes the high signal from lead 151 and applies a high signal to lead 153, energizing reed relay coils 175 and 176. Energized coil 175 closes contacts 165 and energized coil 176 closes contacts 170. The signal on capacitor 160 is therefore transferred to lead 185 which is referenced to input circuit ground 180. After the signal on capacitor 160 has been sampled or examined by the input circuitry timing circuit 150 removes the signal on lead 153, opening contacts 165 and 170 and disconnecting capacitor 160 from lead 185 to disconnect acquisition circuit 110 from the common lead. Electrical isolation is provided since contact set 125 and 130 and contact set 165 and 170 are never closed simultaneously.

Each prior art data acquisition circuit performs the same cycle in transferring signals from its input to common lead 195. In order to detect a malfunction or break in thermocouple 112 an isolated power supply 117 is required. One side of the power supply is connected via the lead 120 to thermocouple lead 114. The other side is connected via lead 116 and resistor 115 to thermocouple lead 113. Resistor 115 is typically in the order of several megohms and the isolated power supply 117 is on the order of ten volts so that the variation in output voltage of thermocouple 112 produced by the power supply 117 is negligible. If thermocouple 112 becomes an open circuit because of breakage or malfunction, however, power supply 117 charges capacitor 121 via resistor 115 so that the power supply voltage develops across capacitor 121. This voltage is transferred via capacitor 160 as described above to lead 185 to the input circuitry to indicate a malfunction of thermocouple 112.

Figure 2:
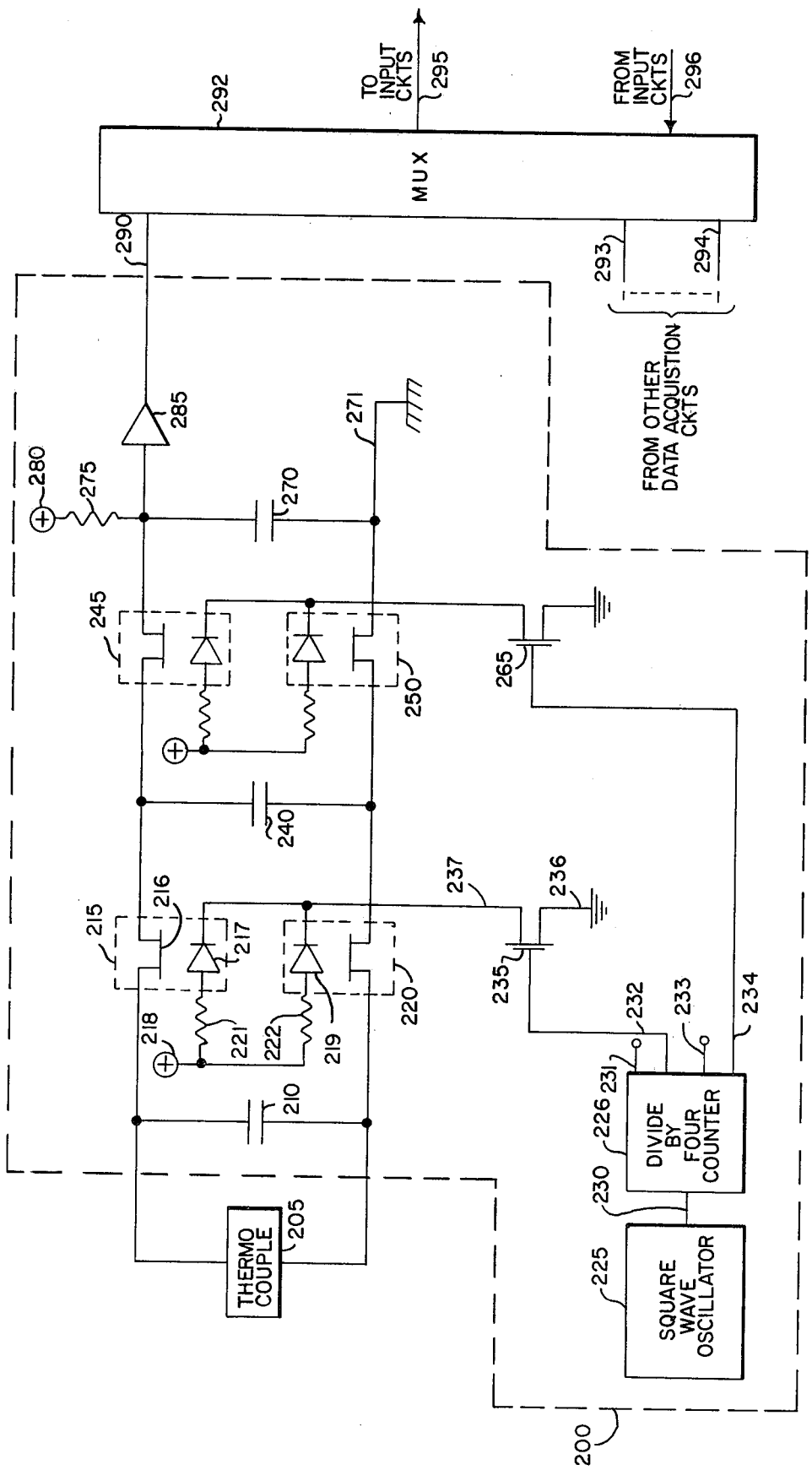
FIG. 2 of the drawing shows a schematic diagram of the inventive data acquisition circuitry complete with a thermocouple monitoring arrangement.

An illustrative embodiment of the inventive data acquisition circuit is shown in FIG. 2. Data acquisition circuit 200 transfers the signal produced by thermocouple 205 to the input circuitry connected to lead 295 while providing electrical isolation as with the prior art circuit. In particular, the signal appearing across thermocouple 205 is applied to capacitor 210. Capacitor 210 is connected on both its leads to semi-conductor optical isolated switches 215 and 220 respectively. Each of these switches, for example switch 215, contains a V-MOS FET transistor 216 which is activated by light energy generated by a light emitting diode 217. In its quiescent state, FET 216 normally has a high resistance between its source and drain leads. However, when a current is passed through LED 217 the resistance between the source and drain leads of FET 216 becomes a relatively low value. Optical isolation devices such as devices 215 and 220 are known in the art. A device suitable for use in the inventive circuit is the model No. OFM-1A monolithic V-MOS solid state relay manufactured by the Theta-J Corporation, 208 West Cummings Park, Woburn, MA. 01801.

Devices 215 and 220 are operated under the control of free-running squarewave oscillator 225 and divide-by-four counter 226. Oscillator 225 is a squarewave oscillator which runs in approximate frequency of 2000 hertz and is of conventional well-known design which will not be described further herein. Oscillator 225 controls devices 215 and 220 by means of divide-by-four counter 226 and FET switch 235. In particular, the square-wave signal on the output lead 230 of oscillator 225 drives counter 226 to produce "high" signals sequentially on counter output leads 231–234. Each signal is "high" for a time period equal to one-half the period of the square wave produced by oscillator 225. FETS 235 and 265 are connected to output leads 232 and 234. Therefore, during the time periods when "high" signals are present on counter output leads 231 and 233 neither FET will be turned on. This connection ensures that capacitor 240 will not be connected to both capacitors 210 and 270 simultaneously. In response to a high signal present on lead 232, FET switch 235 switches "on" and provides a low impedance between its drain 237 and its source 236 which is grounded. The low resistance between the source and drain of FET switch 235 allows current to flow from voltage source 218 through current-limiting resistors 221 and 222, light-emitting diodes 217 and 219 and FET switch 235 to ground. Light emitting diodes 217 and 219 are thereby activated and in turn cause devices 215 and 220 to go into their low resistance state. The voltage signal on capacitor 210 is thereby transferred to capacitor 240. Subsequently, continuing the measurement cycle, divide-by-four counter 226 places a low signal on its output lead 232. The low signal is applied to the gate lead of FET switch 235, turning it off which, in turn, turns off diodes 217 and 219. Devices 215 and 220 therefore revert to a high resistance state effectively disconnecting capacitor 240 from capacitor 210. Subsequently divide-by-four counter 226 places a high signal on lead 234 which is applied to a FET switch 265. Current flowing through FET switch 265 places optical isolator devices 245 and 250 in their low resistance state as previously described in connection with FET 235 and optical isolator drivers 215 and 220.

Advantageously, in accordance with the invention, when optical isolator devices 245 and 250 enter their low resistance state, the voltage on capacitor 240 is transferred to the voltage on an additional sampling capacitor 270. To complete the measurement cycle, counter 226 places a low signal on lead 234, which low signal turns off FET 265 and, in turn, disconnects capacitor 270 from capacitor 240. The cycle is then repeated. Also, in accordance with the invention, square-wave oscillator 225 and counter 226 continue operating FET switches 235 and 265 to alternately connect capacitor 240 to capacitor 210 and capacitor 270 respectively. Thus a sampled voltage is continuously available at the output of the circuit.

At any one time, however, devices 215, 220 or devices 245, 250 are in a high resistance state and thus there is no direct electrical path between capacitor 210 and 270. The circuit thereby provides sufficient electrical isolation to protect the input circuitry from extraneous voltages and noise.

Capacitor 270 has one of its leads referenced to input circuit ground 271. The other input lead is provided to the input of high impedance amplifier 285. Amplifier 285 insures that the signal on capacitor 270 is not loaded. The output of the data acquisition circuit appears on lead 290. Lead 290 is applied to the input of a multiplexer circuit 292. Also applied to the input of multiplexer 292 are the output leads 293 and 294 from other data acquisition circuits. The details of these circuits have been omitted for clarity in the description, however, they have circuitry equivalent to that shown in acquisition circuit 200. The input circuitry controls multiplexer 292 via lead 296 to select the output produced by one of the data acquisition circuits. This output appears on lead 295 and is applied to the data input circuits. However, advantageously, since the signal produced by each data acquisition circuit is effectively available at any time, multiplexer 292 can be operated at a speed which is several times faster than previously obtainable with prior art circuitry.

In addition, advantageously according to the invention, electrical charge on capacitor 270 is also transferred in the reverse direction to capacitor 210 as will be hereinafter described. This characteristic of the inventive circuitry allows for particularly simple operation with a thermocouple.

In particular, the charge on capacitor 270 is transferred via capacitor 240 to capacitor 210 and thus to thermocouple 205. The state of thermocouple 205 may be monitored by connecting voltage source 280 via resistor 275 to capacitor 270 as shown in FIG. 2. Source 280 is connected on the output (isolated) side of the data acquisition circuit and therefore need not be isolated. Resistor 275 is on the order of several megohms and thus a small current runs from source 280 through resistor 275 to charge capacitor 270. However, since charge is being continuously transferred, according to the invention, from capacitor 270 via capacitor 240 to capacitor 210, any charge which might otherwise accumulate on capacitor 270 is conducted to capacitor 210 which is in turn discharged by current running through thermocouple 205. Since the operation of the optical isolator switches is continuous, no appreciable voltage builds up on capacitor 270 and thus the effect on the signal output is negligible. However, if thermocouple 205 should become broken and the current running therethrough cease, no charge transfer will take place between capacitor 270 and capacitor 210. Capacitor 270 will therefore charge to the supply voltage 280. This increase in voltage will be sensed by the input circuitry and used to indicate a thermocouple malfunction.

Other variations of the inventive circuitry will be obvious to those skilled in the art. For example, the illustrative data acquisition circuitry need not be used with a thermocouple input but may be used in any application requiring an electrically isolated data input. Other variations within the spirit and scope of the invention will be obvious to those skilled in the art.

What is claimed is:

1. Data acquisition apparatus for transferring signals produced by a sensing element to input circuitry while maintaining electrical isolation between said sensing element and said input circuitry, said data acquisition apparatus comprising:

first means for temporarily storing said signals,
second means for temporarily storing said signals,
first means operable to transfer signals from said sensing element to said first storage means,
second means operable to transfer signals from said first storage means to second storage means,
means for alternately operating said first transferring means and said second transferring means in a continuous sequence and,
third means responsive to control signals produced by said input circuitry for selectively transferring signals stored in said second storage means to said input circuitry.

2. Data acquisition apparatus according to claim 1 wherein said first and said second storage means comprise capacitors.

3. Data acquisition apparatus according to claim 2 wherein said first and said second transferring means comprise optical isolation elements.

4. Data acquisition apparatus according to claim 1 wherein said means for operating said transferring means comprises a free-running oscillator.

5. Data acquisition apparatus for transferring signals produced by a thermocouple to input circuitry while maintaining electrical isolation between said thermocouple and said input circuitry, said data acquisition apparatus comprising:

first means for temporarily storing said signals,
second means for temporarily storing said signals,
first means operable to transfer signals from said thermocouple to said first storage means,
second means operable to transfer signals from said first storage means to second storage means,
means for alternately operating said first transferring means and said second transferring means in a continuous sequence,
third means responsive to control signals produced by said input circuitry for transferring signals stored in said second storage means to said input circuitry, and
means for detecting a break in said thermocouple comprising:
a voltage source and
an impedance connecting said voltage source to said second storage means; the value of said impedance being high relative to the value of the impedance of said thermocouple.

6. Data acquisition apparatus according to claim 5 wherein said first and second storage means comprise capacitors.

7. Data acquisition apparatus according to claim 6 wherein said first and said second transferring means comprise optical isolation elements.

8. Data acquisition apparatus according to claim 5 wherein said means for operating said transferring means comprises a free-running oscillator.

9. Data acquisition apparatus for transferring signals produced by a sensing element to input circuitry while maintaining electrical isolation between said sensing element and said input circuitry, said data acquisition apparatus comprising:
a first sample-and-hold capacitor,
a second sample-and-hold capacitor,
first semi-conductive means connecting said first sample-and-hold capacitor to said sensing element,
second semi-conductive means connecting said first sample-and-hold capacitor to said second sample-and-hold capacitor, and
free-running oscillator means for alternately operating said first and second semi-conductive means in a continuous process to alternately connect said first sample-and-hold capacitor to said sensing element and said second sample-and-hold capacitor.

10. Data acquisition apparatus according to claim 9 wherein said free-running oscillator means comprises a free-running squarewave oscillator and a divide-by-four counter responsive to the output of said free-running oscillator for generating sequentially four output signals.

11. Data acquisition apparatus according to claim 10 wherein said first semi-conductive means comprises
an optical isolator element connected to said sensing element and said first sample-and-hold capacitor, and
an FET switch responsive to one of said divide-by-four counter outputs for operating said optical isolator element to connect said sensing element to said first sample-and-hold capacitor.

12. Data acquisition apparatus according to claim 11 wherein said second semi-conductive means comprises
an optical isolator element connected to said first sample-and-hold capacitor and said second sample-and-hold capacitor, and
an FET switch responsive to another of said divide-by-four counter outputs for operating said optical isolator element to connect said first sample-and-hold capacitor to said second sample-and-hold capacitor.

13. Data acquisition apparatus for transferring signals produced by a thermocouple to computer input circuitry while maintaining electrical isolation between said thermocouple and said input circuitry, said data acquisition apparatus comprising:
a capacitor connected across said thermocouple for receiving said signals,
a first sample-and-hold capacitor for temporarily storing said signals,
a second sample-and-hold capacitor for temporarily storing said signals,
a first pair of optical isolator elements connected to said capacitor and said first sample-and-hold capacitor and operable to transfer signals on said capacitor to said first sample-and-hold capacitor,
a second pair of optical isolator elements connected to said first sample-and-hold capacitor and said second sample-and-hold capacitor and operable to transfer signals on said first sample-and-hold capacitor to said second sample-and-hold capacitor,
a free-running squarewave oscillator,
a divide-by-four counter responsive to the output of said free-running oscillator for generating sequentially four output signals,
a first FET switch responsive to one of said divide-by-four counter outputs for operating said first pair of optical isolator elements to connect said thermocouple to said first sample-and-hold capacitor,
a second FET switch responsive to another of said divide-by-four counter outputs for operating said second pair of optical isolator elements to connect said first sample-and-hold capacitor to said second sample-and-hold capacitor, and
a multiplexer responsive to control signals produced by said input circuitry for transferring signals stored in said second sample-and-hold capacitor to said input circuitry.

14. Data acquisition apparatus according to claim 13 further comprising means for detecting a break in said thermocouple comprising:
a voltage source, and
an impedance connecting said voltage source to said second sample-and-hold capacitor; the value of said impedance being high relative to the value of the impedance of said thermocouple.

* * * * *